United States Patent
Zieboll et al.

(10) Patent No.: US 9,784,179 B2
(45) Date of Patent: Oct. 10, 2017

(54) ADJUSTMENT DEVICE FOR AN EXHAUST GAS TURBOCHARGER

(71) Applicant: IHI CHARGING SYSTEMS INTERNATIONAL GMBH, Heidelberg (DE)

(72) Inventors: Nicolas Zieboll, Bad Schoenborn (DE); Hermann Burmester, Heidelberg (DE)

(73) Assignee: IHI CHARGING SYSTEMS INTERNATIONAL GMBH, Heidelber (DE)

( * ) Notice: Subject to any disclaimer, the term of this patent is extended or adjusted under 35 U.S.C. 154(b) by 488 days.

(21) Appl. No.: 14/569,679

(22) Filed: Dec. 13, 2014

(65) Prior Publication Data
US 2015/0118027 A1    Apr. 30, 2015

Related U.S. Application Data
(63) Continuation-in-part of application No. PCT/EP2013/001706, filed on Jun. 11, 2013.

(30) Foreign Application Priority Data
Jun. 21, 2012    (DE) .................. 10 2012 105 402

(51) Int. Cl.
F01D 17/10    (2006.01)
F02B 37/18    (2006.01)
F16C 11/02    (2006.01)

(52) U.S. Cl.
CPC .......... *F02B 37/186* (2013.01); *F01D 17/105* (2013.01); *F16C 11/02* (2013.01); *Y02T 10/144* (2013.01)

(58) Field of Classification Search
CPC ..... F01D 17/105; F02B 37/183; F02B 37/186
See application file for complete search history.

(56) References Cited

U.S. PATENT DOCUMENTS
3,427,897 A * 2/1969 Engelmann ............. F02D 11/04
                                                        411/520
6,895,947 B2 * 5/2005 Allmang ................ F01D 17/165
                                                        123/559.3

FOREIGN PATENT DOCUMENTS
| DE | WO 2012052124 A1 * | 4/2012 | ........... F01D 17/105 |
| GB | 2 151 700 A | 7/1985 | |
| WO | 2005/008041 A1 | 1/2005 | |
| WO | 2011/026471 A1 | 3/2011 | |

* cited by examiner

*Primary Examiner* — Justin Seabe
(74) *Attorney, Agent, or Firm* — Klaus J. Bach

(57) ABSTRACT

In an adjusting device for an exhaust gas turbocharger with a first adjusting member and a second adjusting member for operating a valve element for varying the flow cross-section of a bypass duct of a flow-through exhaust gas guide portion of a turbine of an exhaust gas turbocharger, the first adjusting member and the second adjusting member are connected so as to be pivotable relative to one another by a pin-shaped connecting element with a locking element establishing a pivot joint of the first adjusting member and the second adjusting member with a predetermined axial engagement force.

5 Claims, 6 Drawing Sheets

STATE OF THE ART

ADJUSTMENT DEVICE FOR AN EXHAUST GAS TURBOCHARGER

This is a Continuation-In-Part application of pending international patent application PCT/EP2013/001706 filed Jun. 11, 2013 claiming the priority of German patent application 10 2012 105402.9 filed Jun. 21, 2012.

BACKGROUND OF THE INVENTION

The invention relates to an adjusting apparatus for an exhaust gas turbocharger with a valve actuated by pivotally interconnected adjustment members.

Patent application DE 10 2010 049 466 A1 discloses an adjusting apparatus for an exhaust gas turbocharger with a turbine, wherein the turbine comprises a through-flow exhaust gas guide portion and a bypass duct which serves to bypass a turbine wheel arranged in the exhaust gas guide portion. The adjusting apparatus comprises a first adjusting member and a second adjusting member. A valve element for varying the flow cross-section of the bypass duct is provided at the first adjusting member. This valve element is indirectly connected with the first adjusting member via a third adjusting member. For a specific movement of the valve element, the first adjusting member and the second adjusting member are connected so as to be movable relative to each other, with the third adjusting member being rigidly, i.e. immovably, connected with the second adjusting member. The movable connection of the first adjusting member with the second adjusting member is achieved by means of a pin-shaped connecting element, a bolt, and a locking element which secures this bolt in its position. The locking element is formed comprising the first adjusting member and the second adjusting member, so that the movable connection is made by means of a compressive stress generated by the locking element, with the first adjusting member and the second adjusting member being axially compressed by the locking element in the area of the movable connection.

During the operation of the exhaust gas turbocharger, in particular, when the exhaust gas turbocharger operates in combination with a combustion engine, the problem occurs that the exhaust gas turbocharger is subjected to temperature variations and physical vibrations.

The temperature variations are caused by continuous heating and cooling of the individual components of the exhaust gas turbocharger, with the largest temperature variations occurring in particular in the area of the turbine of the exhaust gas turbocharger due to the combustion product of the combustion engine flowing through the exhaust gas guide portion. Thus, the closer a component of the exhaust gas turbocharger is arranged at a duct through which the combustion product flows, the higher is the failure probability of this component. The repetitive temperature variations lead to a continual change in the expansion of the components, which may result in loosening, stress or material fatigue. Due to the fact that the movable connection is formed by the locking element which exerts a compressive stress on the adjusting members, one outer surface of the locking element is positioned near the duct for the combustion product and is therefore subjected to the above mentioned temperature variations.

Due to the movements of the combustion engine's components during operation, such as e.g. a reciprocating movement of the pistons, an associated rotational movement of the crank shaft or rotational movements of the cam shaft, physical vibrations may also occur. Since the exhaust gas turbocharger is mechanically connected with the combustion engine, these physical vibrations may be accompanied by disturbing noise like rattling or rustling of the adjusting apparatus of the exhaust gas turbocharger. Moreover, pulsations and vibrations of combustion gases of the combustion engine when flowing through the exhaust gas turbocharger and in particular when flowing through its bypass duct apply additional forces to the valve element and thus to the adjusting members connected with it, which even amplify these physical vibrations of the adjusting apparatus and the associated rustling and rattling noise.

In addition, these physical vibrations may also lead to loosening of originally fixed connections due to wear of relatively moving components of the connections, which ultimately may result in a reduced operational reliability, at least, however, in a limited functionality. These effects may occur, in particular, if the first adjusting member loses its nearly rectangular position in respect to a longitudinal axis of the connecting element and is inclined relative to this longitudinal axis. This inclination leads to increased physical contact forces between the relevant adjusting member and the connecting element, so that significant wear and an associated life reduction of the adjusting apparatus may occur.

It is the principal object of the present invention to provide a cost-effective adjusting apparatus for an exhaust gas turbocharger, which simultaneously increases the operational reliability and the service life due to the reduction of wear.

SUMMARY OF THE INVENTION

In an adjusting device for an exhaust gas turbocharger with a first adjusting member and a second adjusting member for operating a valve element for varying the flow cross-section of a bypass duct of a flow-through exhaust gas guide portion of a turbine of an exhaust gas turbocharger, the first adjusting member and the second adjusting member are connected so as to be pivotable relative to one another by a pin-shaped connecting element with a locking element establishing a pivot joint of the first adjusting member and the second adjusting member with a predetermined axial engagement force.

For making the pivot joint of the first adjusting member and the second adjusting member of the inventive adjusting apparatus oft an exhaust gas turbocharger, a tensile stress is generated by the locking element and acting in both directions of a longitudinal axis of the connecting element. This means that the locking element applies a tensile stress on the movable connection which is achieved by means of the connecting element between the first adjusting member and the second adjusting member.

In particular, the adjusting apparatus comprises the locking element for securing the connection of the first adjusting member with the second adjusting member by means of the connecting element, which is formed so as to apply a tensile stress by generating a compressive stress on the connecting element. In other words, this means that the locking element is formed so as to apply a tensile stress on the connecting element acting in both directions of the longitudinal axis of the connecting element, wherein the tensile stress results from a compressive stress generated by the locking element.

A major advantage of the invention is lower space requirement compared to a locking element which applies a compressive stress to the connecting element. The reason is that the locking element which may apply a tensile stress requires less space due to its positioning and inherent resiliency. The unit which is formed by the first adjusting member and the second adjusting member needs not be encompassed by the locking element, but a space between an upper side of the first adjusting member and a suitable fastening means at the connecting element may be utilized.

The configuration thereby obtained is more compact compared to the prior art, in other words, it requires a smaller length of the locking element, provides for a small material thickness and material width of the locking element to achieve the same three.

Another advantage is that only one component, i.e. the locking element, is required for securing the movable connection. In case of a locking element which applies a compressive stress, which comprises the entire unit including the connecting element and the first adjusting member as well as the second adjusting member, an additional locking element, e. g. a lock washer, is required, in order to obtain the necessary movable connection between the first adjusting member and the second adjusting member.

It is also very advantageous that the locking element of the inventive adjusting apparatus may be installed facing away from the turbine casing, so that the locking element is subjected to considerably less heat emitted from the turbine casing. Depending on the installation position, one of the adjusting members additionally serves as a heat shield for the locking element, so that the locking element is subjected to less heat emitted from the turbine casing. Thus, a material may be selected for the locking element, which has to meet lower requirements concerning the maintenance of the spring force even at higher turbine operating temperatures and frequently repeating temperature changes. This reduces the expensive alloy contents for improving heat resistance in the material of the locking element and simultaneously improves the machinability of the material in the manufacturing process of the locking element and therefore the overall manufacturing costs.

Thus, the inventive adjusting apparatus shows a significant reduction of wear with a simultaneous cost reduction, and the service life both of the adjusting apparatus alone and the entire turbocharger is considerably increased.

In particular, the locking element is formed in a simple and therefore cost-reducing configuration, wherein a predetermined pre-stress is obtained.

In an advantageous configuration of the inventive adjusting apparatus, the locking element is designed clamp-type. This means that the locking element comprises two opposite locking wings, a first locking wing and a second locking wing, which are formed resiliently deformable by means of a third locking wing, e.g. by means of a U-shaped leg spring. In the installed state, this leg spring exerts a tensile stress on the connecting element, because the first locking wing is supported on the connecting element in a groove and the second locking wing is supported on one of the adjusting members. The tensile stress results in a compressive stress acting on the collar of the connecting element, so that any inclination or tilting, respectively, of the first adjusting member and consequently wear due to physical friction may be prevented.

Another advantage is that a space between the upper surface of the e.g. first adjusting member and the groove of the pin-shaped connecting element is utilised. This arrangement allows to significantly shorten the required lengths of the locking wings of the locking element compared to the above described encompassing arrangement. Thereby, the width of the locking element and its material thickness may also be reduced for applying a force equivalent to the encompassing arrangement. As a whole, this contributes to lower space requirement and significantly less material for the locking element.

In another embodiment of the inventive adjusting apparatus, a sleeve is provided which extends in the axial length of the connecting element and encompasses the connecting element essentially over an inner free height of the locking element. A free space is formed between two opposite arranged locking wings of the locking element, which in the installed condition of the locking element has an inner free height. By means of this sleeve, the surface pressure between the pin-shaped connecting element and a hole wall abutting the connecting element of the first adjusting member may be achieved, which results in a further reduction of wear.

In a simple and cost-effective configuration, the sleeve is integrally formed with the first adjusting member. It is manufactured in a shaping method, e.g. deep-drawing, punching or by means of a so-called flow drill method.

Further advantages, features and details of the invention will become more readily apparent from the following description of preferred exemplary embodiments thereof with reference to the accompanying drawings.

DESCRIPTION OF PARTICULAR EMBODIMENTS

Figure 1:
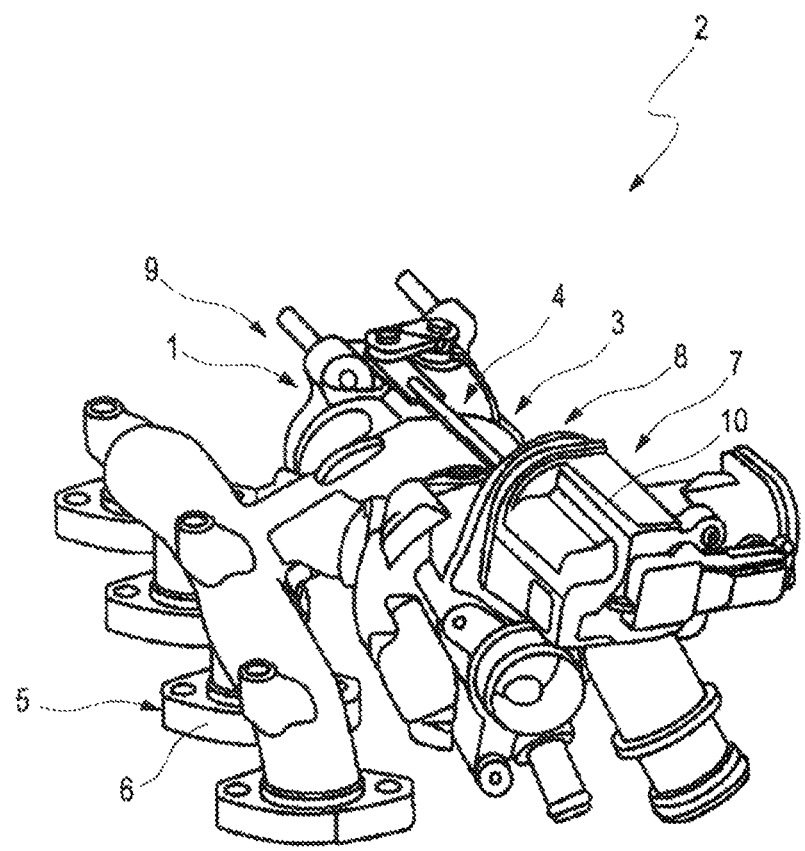
FIG. 1 shows a perspective view of an exhaust gas turbocharger with an adjusting device according to the state of the art.

An adjusting device 1 of an exhaust gas turbocharger 2 according to the state of the art is configured as shown in FIG. 1. The exhaust gas turbocharger 2 comprises a turbine 3 with a through-flow exhaust gas guide portion 4 through which exhaust gas is flowing during the operation of the exhaust gas turbocharger. The exhaust gas is generally a combustion product of a combustion engine 5, of which in FIG. 1 only a portion is shown in the form of an exhaust gas manifold 6 of the combustion engine 5.

The exhaust gas turbocharger 2 is associated with a through-flow air guide portion 7 as well as with a bearing portion 8 positioned between the exhaust gas guide portion 4 and the air guide portion 7, wherein a rotating assembly (not shown in detail) is rotatably accommodated in the bearing portion 8. The rotating assembly comprises a compressor wheel (not shown in detail) and a turbine wheel (not shown in detail), which are firmly connected to each other via a shaft (not shown in detail). The compressor wheel is rotatably accommodated in a first wheel chamber (not shown in detail) of the air guide portion 7 for drawing-in generally fresh air, and the turbine wheel is rotatably accommodated in a second wheel chamber (not shown in detail) of the exhaust gas guide portion 4. During operation of the exhaust gas turbocharger 2, the exhaust gas flowing through the exhaust as guide portion 4 flows into the turbine wheel and drives it, so that it may perform a rotating movement. This rotating movement is transferred via the shaft to the compressor wheel which rotates simultaneously with the rotating turbine wheel. Fresh air is drawn in by the compressor wheel and is compressed in the air guide portion 7.

The exhaust gas turbocharger 2 is configured as a so-called wastegate charger, i.e. it comprises an apparatus 9 for the complete or partial bypassing of the turbine wheel. This apparatus 9 which will be referred to as bypass apparatus in the Wowing comprises besides a bypass duct (not shown in detail) in the exhaust gas guide portion 4 a valve element, preferably in the form of a flap, generally referred to as wastegate flap or wastegate valve (in FIG. 1 not shown in detail), which is designed for closing the bypass duct, as well as the adjusting device 1 for actuating this valve element. This adjusting device 1 comprises an actuating element 10, generally a so-called pressure cell, which through the charging pressure to be taken from the air guide portion 7 initiates opening or closing of the bypass duct by means of the valve element. An electronically or electrically operating actuating element 10 is also conceivable which initiates opening and closing of the bypass duct. In other words, this means that varying of the flow cross-section of the bypass duct of the exhaust gas guide portion 4 of the turbine 3 may be achieved by means of the valve element.

Figure 2:
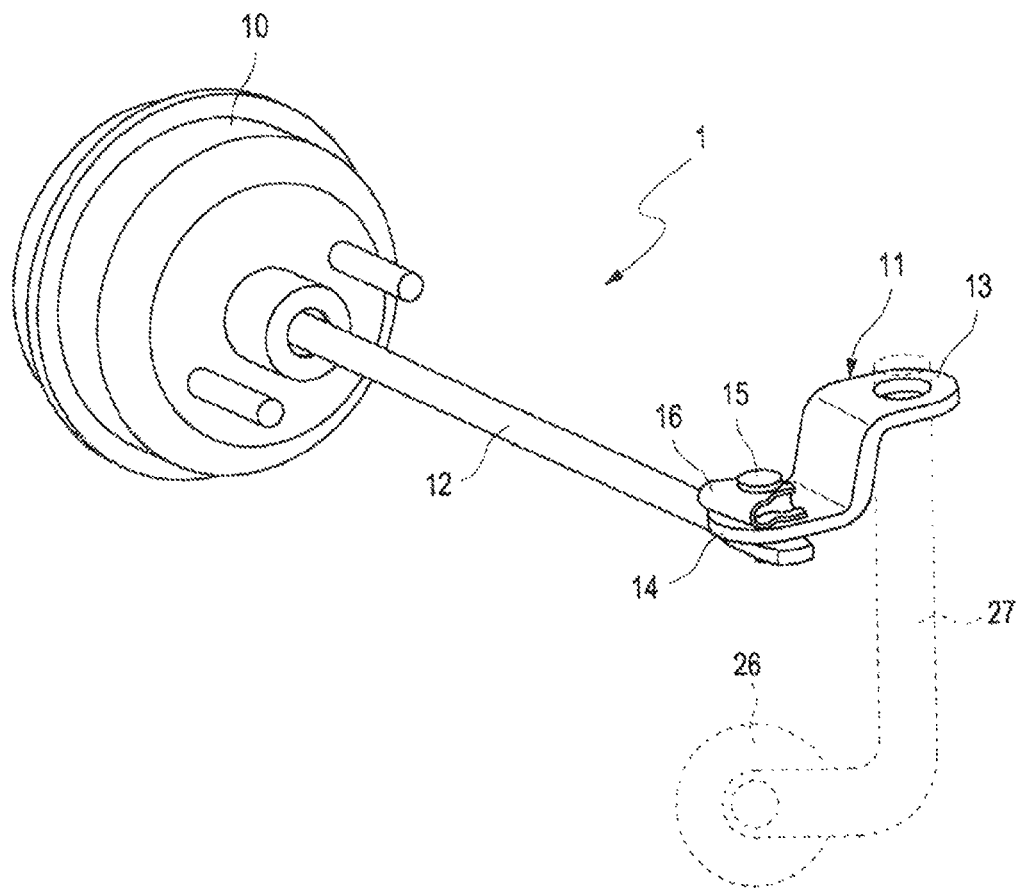
FIG. 2 shows a perspective view of a section from the inventive adjusting device for an exhaust gas turbocharger.
Figure 3:
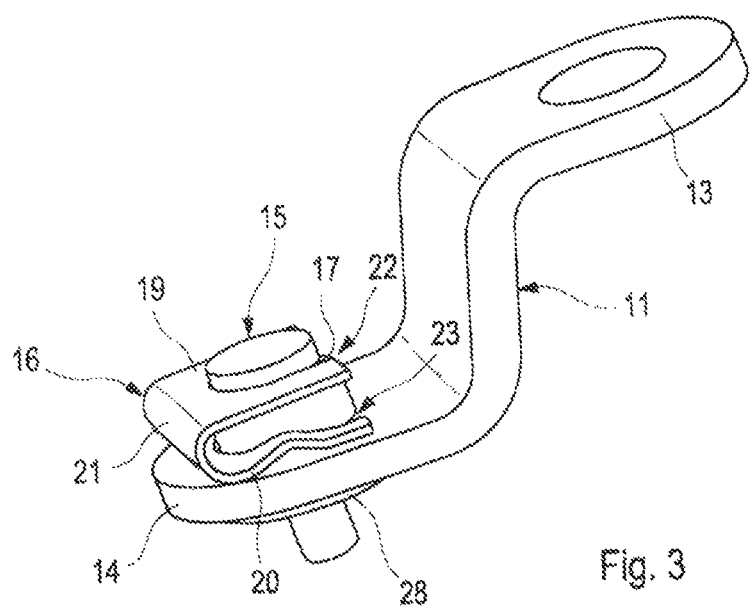
FIG. 3 shows a perspective view of a first adjusting member of the adjusting device in FIG. 2 with a connecting element and a locking element.

In accordance with the present invention, an adjusting device 1 is configured according to FIG. 2 or FIG. 3, respectively, wherein the actuating element 10 of this exemplary embodiment is in the form of a pressure cell. The adjusting device 1 comprises a first adjusting member 11 and a second adjusting member 12, with the valve element 26 being provided at the first adjusting member 11. The first adjusting member 11 and the second 115 adjusting member 12 are connected so as to be movable relative to with each other. In this exemplary embodiment, the valve element 26 for opening or closing of the bypass duct is arranged indirectly at a first end 13 of the first adjusting member 11. The second adjusting member 12 is disposed at a second end 14 of the first adjusting member 11. Depending on the construction of the adjusting apparatus 1, the valve element 26 could also be arranged immediately at the first adjusting member 11.

The valve element 26 is connected via a third adjusting member 27 with the first adjusting member 11, wherein the third adjusting member 27 is configured as a shaft. The third adjusting member 27 is suitably and rotatably supported in the exhaust gas guide portion 4. The rotating movement of the third adjusting member 27 is initiated by the actuating element 10, wherein the second adjusting member 12, herein formed as a piston rod or membrane connecting rod, performs an essentially translatory movement caused by the actuating element 10. Due to the movable connection of the second adjusting member 12 with the first adjusting member 11, the movement of the second adjusting member 12 is transferred by the first adjusting member 11 to the third adjusting member 27 via a firm connection between the first adjusting member 11 and the third adjusting member 27.

For making the movable connection of the first adjusting member 11 with the second adjusting member 12, a pin-shaped connecting element 15 and locking element 16 are provided. The locking element 16 is designed in such a manner that the movable connection may be accomplished by means of a tensile stress acting in both directions of a longitudinal axis A of the connecting element 15, which is initiated by the locking element 16. Because the tensile stress initiated by the locking element 16 acts in both directions of the longitudinal axis A, this action may also be referred to as a spreading force action of the locking element 16.

The connecting element 15 is pin-shaped or bolt-shaped with a longitudinal axis A and comprises an annular groove 17 in the area of one axial end and an abutment collar 28 at the opposite axial end. This annular groove 17 serves to at least partially accommodate the locking element 16 and is therefore a suitable fastening device.

Figure 5A:
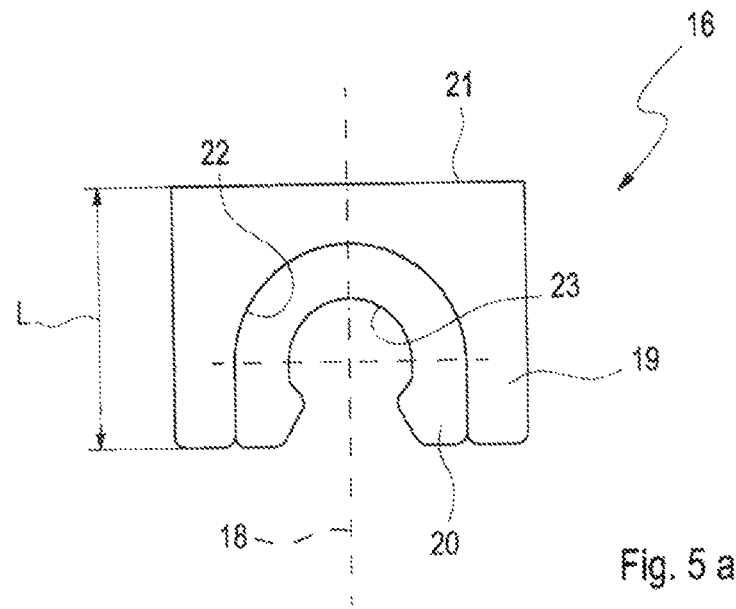
FIG. 5a shows a plan view of the locking element of the inventive adjusting device according to the invention.
Figure 5B:
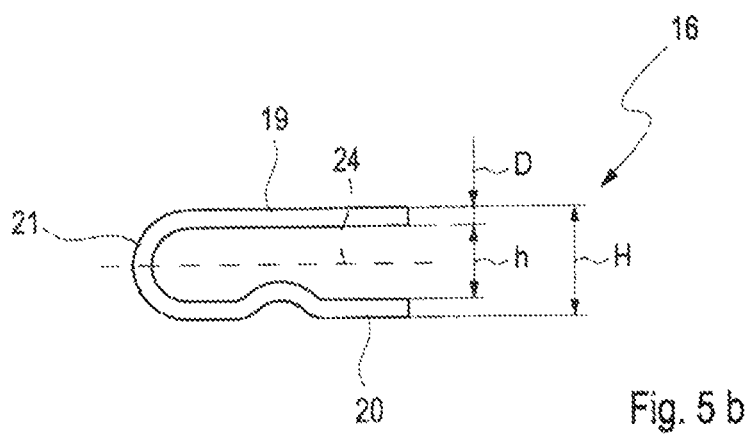
FIG. 5b shows a contour of the locking element of FIG. 5a in a longitudinal sectional taken along an axis of intersection.

The locking element 16 according to FIG. 5*a*, 5*b* is configured clamp-type and exhibits a U-shaped profile in a section along an axis of intersection 18. In other words, the locking element 16 comprises a first locking wing 19, a second locking wing 20 opposite the first locking wing 19 as well as a third locking wing 21 which connects the first locking wing 19 with the second locking wing 20.

The third locking wing 21 is formed as some kind of a hollow cylinder which is split along its longitudinal axis, which accommodates the first locking wing 19 at one of its open longitudinal ends and, at the other open longitudinal end, the second locking wing 20 so as to form a connecting intermediate element. The locking element 16 provides for an elastic effect. Ideally, the locking element 16 is a one-piece design.

The locking element 16 comprises a centrally arranged first indentation 22 at its first locking wing 19 for accommodating the connecting element 15. The second locking wing 20 is also provided with a centrally arranged second indentation 23. This second indentation 23 serves as a direct or indirect accommodation for the connecting element 15. Both the first indentation 22 and the second indentation 23 need not necessarily be arranged centrally in the first locking wing 19 or in the second locking wing 20, respectively; they may also be positioned asymmetrically in the respective locking wing 19, 20.

For exerting the spreading force action on the connecting element 15, the first locking wing 19 is formed essentially plane, at least over its effective area. In other words, the first locking wing 19 is formed almost parallel to a plane of intersection 24 which extends between the first locking wing 19 and the second locking wing 20.

For providing a clamping action, the second locking wing 20 exhibits a curvature which deviates from the parallelism to the plane of intersection 24, with this curvature being formed as a convex curvature only partially in the second locking wing 20 relative to the first plane of intersection 24 according to FIG. 5*b*.

Figure 5C:
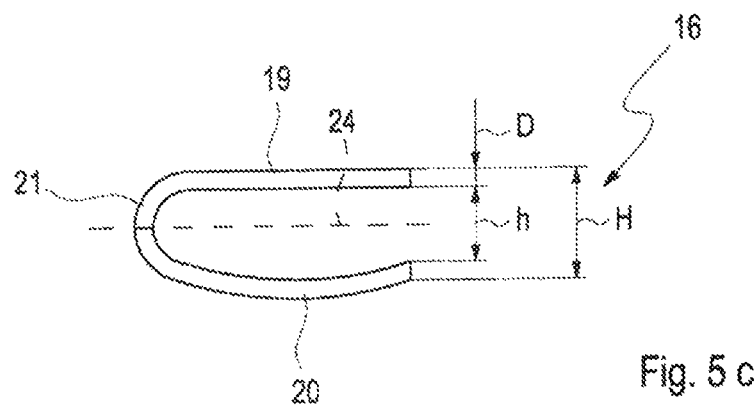
FIG. 5c shows a contour of a modified locking element in a longitudinal section along the axis of intersection.

In another exemplary embodiment of the locking elements 16 according to FIG. 5*c*, the second locking wing 20 is curved over its entire length L and exhibits a concave curvature relative to the first plane of intersection 24.

Regardless of a convex or a concave curvature and also regardless of whether this curvature extends over the entire length L of the second locking wing 20, the locking element 16 is positioned for securing the connection between the first adjusting member 11 and the second adjusting member 12 in such a manner that it is completely arranged on one side of the first adjusting member 11.

To secure the connection, the connecting element 15 accommodates the first locking wing 19 in its annular groove 17 via the first indentation 22. The second locking wing 20 is arranged between the first adjusting member 11 and the first locking wing 19 in the position of the locking element 16 shown in FIGS. 2 and 3.

To reduce wear, the adjusting device 1 comprises a sleeve 25 which extends in the axial length of the connecting element 15. This sleeve 25 is formed essentially comprising the connecting element 15 over an inner free height h of the locking element 16, with the inner free height h corresponding to the distance of opposite surfaces of the first locking wing 19 and the second locking wing 20 in the installed condition.

Figure 4:
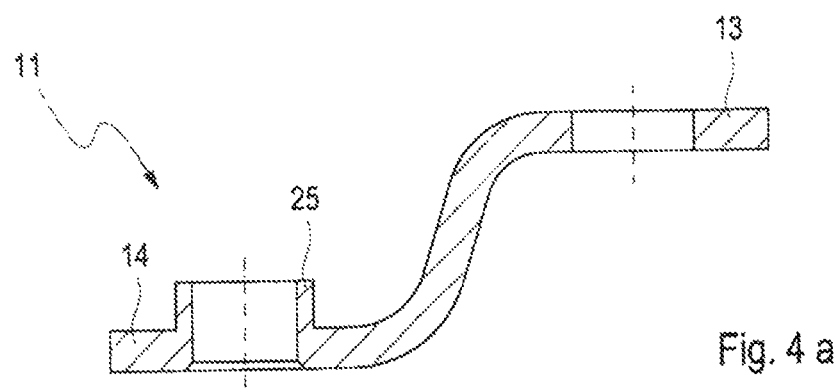
FIG. 4a shows a longitudinal section through the first adjusting member shown in FIG. 3.
FIG. 4b shows a longitudinal section through a modified adjusting member.
Figure 4:
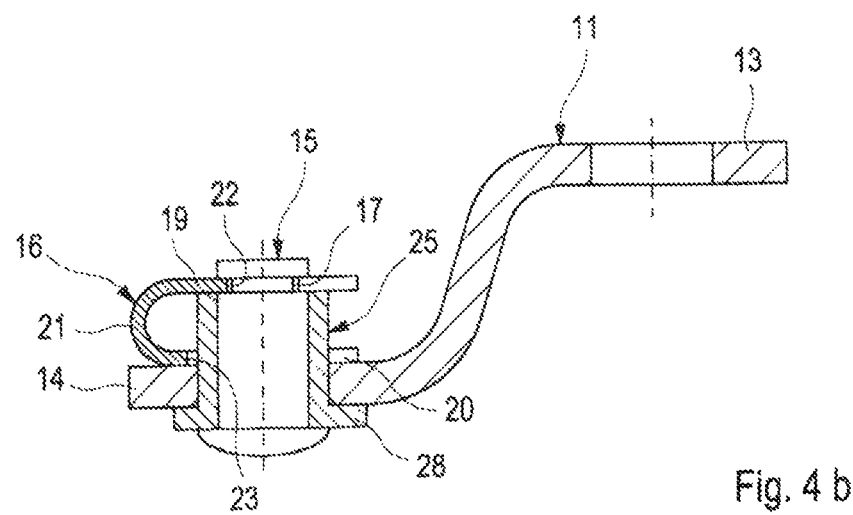

The sleeve 25 is integrally formed with the adjusting member 11 as shown in FIG. 4a. The sleeve 25 could also be formed separate from the first adjusting member 11 as shown in FIG. 4b. In this case, the sleeve 14 is formed as a bushing which completely penetrates the first adjusting member 11. The bushing 14 must be suitably fastened in the adjusting member 11, e.g. by shrinking or by providing a collar. The total length of the bushing 14 must at least exceed the material thickness of the adjusting member 11.

In another exemplary embodiment (not shown in detail) the sleeve 25 is integrally formed with the locking element 16, with the second locking wing 20 accommodating the sleeve 25 in its second indentation 23 and in a fixed connection. This spreading force action applies a tensile stress on the cylinder-shaped portion of the connecting element 15, which penetrates the first adjusting member 11 in the sleeve at the second end 14 and simultaneously creates a compressive stress between the bottom side of the first adjusting member 11 and the abutment collar 28 of the connecting element 15 by pressing the bottom side of the first adjusting member 11 at its second end 14.

The locking element 16 is designed so as to create a nearly constant surface pressure over an axial length l of the connecting element 15. The axial length l of the connecting element 15 corresponds to the free height h plus a thickness D of the second locking wing 20.

Figure 6:
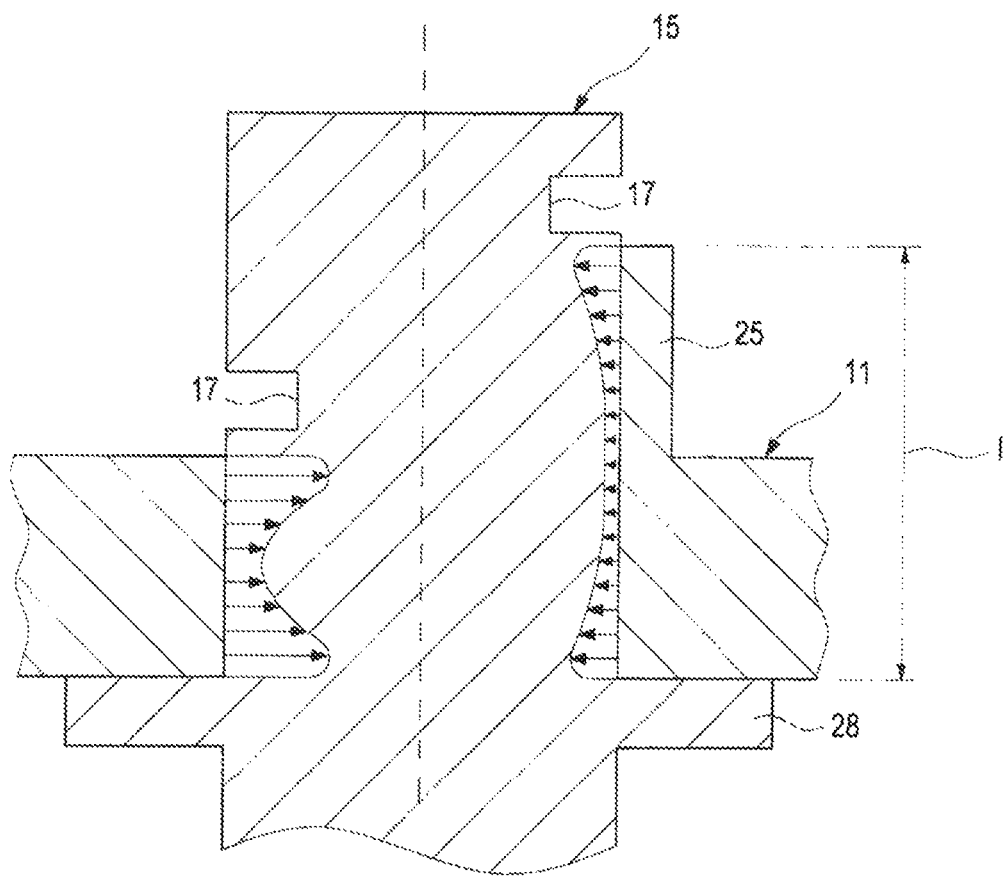
FIG. 6 is a schematic representation of the pressure distribution on the connecting element during operation in an adjusting device in FIG. 1 as well as in an adjusting device in FIG. 2.

FIG. 6 is a schematic representation of a pressure distribution in a connecting element 15 with a locking element 16 during operation of the exhaust gas turbocharger 1. In the left half of the figure, a pressure distribution in the connecting element 15 with the locking element 16 is shown, while in the opposite right half of the figure, the pressure distribution in the connecting element 15 with the locking element 16 and the sleeve 25 is shown. In the locking element 16 in connection with the sleeve 25, the surface pressure is considerably reduced over the axial length l as well as in the peaks.

Figure 7:
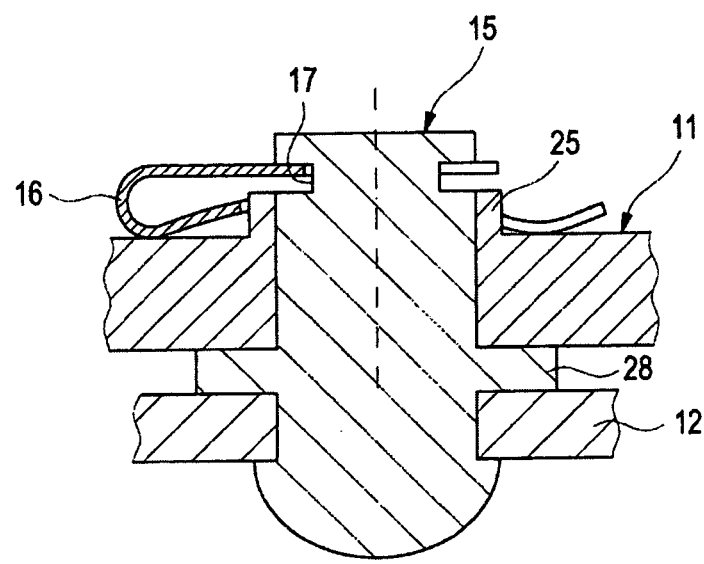
FIG. 7 shows a section through a movable connection of the inventive adjusting device in a first variant.
Figure 8:
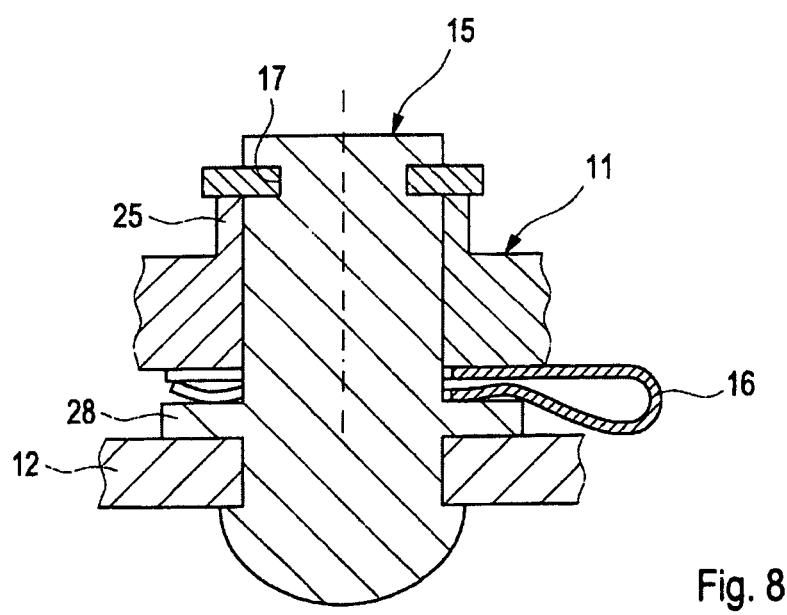
FIG. 8 shows a section through a movable connection of the inventive adjusting device in a second embodiment.

Two alternative exemplary embodiments are configured according to FIGS. 7 and 8.

In both exemplary embodiments, the abutment collar 28 is positioned between the first adjusting member 11 and the second adjusting member 12, while, in the first variant, the first adjusting member 11 is arranged between the locking element 16 and the abutment collar 28 and, in the second variant, the locking element 16 is accommodated between the first adjusting member 11 and the abutment collar 28. For the secured connection, an additional locking element in the form of a lock washer 29 is provided in the second variant.

What is claimed is:

1. An adjusting device for an exhaust gas turbocharger with a turbine (3) comprising a flow-through exhaust gas guide portion (4) and a bypass duct which serves to bypass a turbine wheel arranged in the exhaust gas guide portion (4), a valve element for varying a flow cross-section of the bypass duct with a first adjusting member (11) connected to the valve element and a second adjusting member (12) pivotally connected to the first adjusting member (11) for actuating the first adjusting member (11) and the valve element, the first adjusting member (11) and the second adjusting member (12) being pivotally joined to one another by a pin-shaped connecting element (15) provided with a locking element (16), the pivotable connection being established with a tensile stress generated by the locking element (16) wherein the locking element (16) is in the form of a U-shaped clamp comprising spaced first and second parallel locking wing sections (19, 20) joined by an intermediate third section (21), the first locking wing section (19) engaging the connecting element (15) which is configured to accommodate the first locking wing section (19) in a groove (17) formed in the connecting element (15) and the second locking wing section (20) abutting the first adjusting member (11) so as to resiliently bias the first adjusting member (11) into contact with the second adjusting member to provide an engagement force acting in the direction of a longitudinal axis (A) of the connecting element (15), the locking element (16) being formed in a single piece for generating a predetermined compressive engagement stress between the first and second adjustment members (11, 12).

2. The adjusting device according to claim 1, wherein a sleeve (25) is provided which extends in the axial length of the connecting element (15) and around the connecting element (15) over an inner free height (h) of the locking element (16).

3. The adjusting device according to claim 2, wherein the sleeve (25) is integrally formed with the first adjusting member (11).

4. The adjusting device according to claim 2, wherein the second locking wing section (20) of the locking element (16) extends around the sleeve (25).

5. The adjusting device according to claim 4, wherein the sleeve (25) is integrally formed with the first adjusting member (11).

* * * * *